United States Patent [19]

Sakurai

[11] Patent Number: 4,516,262

[45] Date of Patent: May 7, 1985

[54] CHARACTER DATA PROCESSING APPARATUS

[75] Inventor: Akira Sakurai, Tokyo, Japan

[73] Assignee: Ricoh Company, Ltd., Tokyo, Japan

[21] Appl. No.: 410,119

[22] Filed: Aug. 20, 1982

[30] Foreign Application Priority Data

Aug. 31, 1981 [JP]  Japan ................................. 56-136480

[51] Int. Cl.$^3$ ............................................. G06K 9/46
[52] U.S. Cl. ....................................... 382/18; 382/22; 382/36
[58] Field of Search ..................... 382/18, 24, 25, 35, 382/36, 69, 22

[56] References Cited

U.S. PATENT DOCUMENTS

3,613,080 10/1971 Angeloni et al. ..................... 382/25
4,003,025 1/1977 Hilliard et al. ....................... 382/69

Primary Examiner—Leo H. Boudreau
Attorney, Agent, or Firm—David G. Alexander

[57] ABSTRACT

A character data processing apparatus discriminates machine-printed characters and hand-printed characters from each other and identifies a class of characters such as kanas (Japanese syllabary) or Kanjis (Chinese characters used in Japan). Characters filled by hand in the blanks on a form carrying machine-printed characters are also transformed automatically into machine-printed characters. Furthermore, characters corrected by hand on a document are transformed into machine-printed characters.

8 Claims, 19 Drawing Figures

CHARACTER DATA PROCESSING APPARATUS

BACKGROUND OF THE INVENTION

The present invention relates to a character data processing apparatus capable of efficiently and easily processing data which may be in the form of different classes of characters such as letters, signs, numerals special symbols, etc.

Documents such as advice forms and business letters are frequently provided in fixed forms which can be repeatedly delivered after replacement of limited data. It is desired that such document in fixed forms be prepared by machines as far as possible. Also, it would be convenient if necessary items filled by hand in the blanks of a form could be automatically transformed into machine-printed characters on a final document, together with those carried on the original form.

Mechanization is also desired for totalizing replies to questionnaires of the type which carries machine-printed questions and requires hand-printed free answers, correcting and editing character data according to characters which were corrected by hand on a galley proof, etc.

None of the prior art document processing apparatuses, however, has succeeded in meeting such demands.

SUMMARY OF THE INVENTION

A character data processing apparatus embodying the present invention includes a scanning means for scanning an original document carrying handwritten character data to produce electric image data. Characters are extracted by character extraction means from the image data one at a time. Characteristics of the extracted character are identified by character identification means. The character thus identified is processed by character processing means into printed character data.

In accordance with the present invention, a character data processing apparatus discriminates printed characters and handwritten characters from each other and identifies a class of characters such as kanas (Japanese syllabary) or kanjis (Chinese characters used in Japan). Characters filled by hand in the blanks on a form carrying printed characters are also transformed automatically into printed characters. Furthermore characters corrected by hand on a document are transformed into printed characters.

It is an object of the present invention to provide a new character data processing apparatus which can readily prepare, correct and edit documents in fixed forms and totalize replies to questionnaires.

It is another object of the present invention to provide a character data processing apparatus which can automatically process into printed characters even necessary items filled by hand in the blanks of a printed form.

It is another object of the present invention to provide a character data processing apparatus which can accurately discriminate printed characters and hand-printed characters on a document in processing character data on the document.

It is another object of the present invention to provide a character data processing apparatus which can surely identify a class of characters on a document such as kanas (Japanese syllabary) or kanjis (Chinese characters used in Japan) in processing character data carried on the document.

It is another object of the present invention to provide a generally improved character data processing apparatus.

Other objects, together with the foregoing, are attained in the embodiments described in the following description and illustrated in the accompanying drawings.

DESCRIPTION OF THE PREFERRED EMBODIMENT

While the character data processing apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
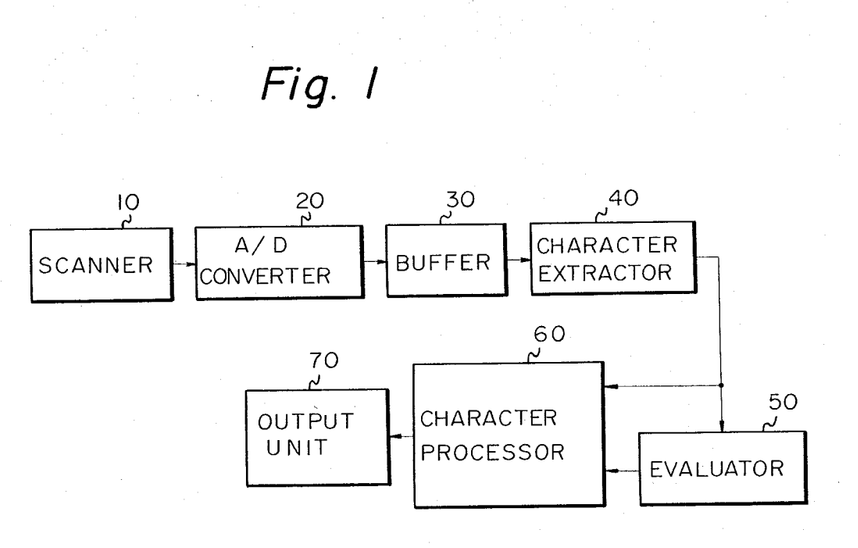
FIG. 1 is a schematic block diagram showing a character data processing apparatus embodying the present invention.

Referring to FIG. 1 of the drawings, the character data processing apparatus includes a scanner 10 which optically scans a document to read picture element by picture element the characters printed either mechanically or by hand thereon. Analog output signals of the scanner 10 are sequentially coupled to an analog-to-digital or A/D converter 20. Binary outputs of the A/D converter 20 are sequentially stored in a buffer 30.

A character extraction unit 40 extracts each character from the patterns stored in the buffer 30. For instance, the character extraction unit 40 may be of the type which counts up black picture elements of the document on successive horizontal scan lines and picks up as a character line a series of scan lines which contain at least a predetermined number of black picture elements. In this case, the unit 40 will then counts up black documents on vertical scan lines for the extracted character line, thereby sequentially picking up the characters on the character line one at a time. Since various techniques have been proposed for such extraction of characters, further description will be omitted for simplicity.

The characters extracted by the character extraction unit 40 are fed to an evaluation unit 50 and a character processing unit 60 character by character. The evaluation unit 50 determines whether each input is a character printed mechanically or one printed by hand, as well as the kind of the character (which may be a Chinese character or kanji or a Japanese syllabary or kana, for example). The result of discrimination is supplied to the character processing unit 60. Details of the character discrimination unit 50 will be described later.

The character processing unit 60 carries out various processings such as recognizing characters, transforming handprinted or handwritten characters into machine-printed or printed characters, or vice versa, correcting printed characters, totalizing and editing. The output of the unit 60 is supplied to a character output unit 70. Any further description of the character processing unit 60 will not be made for simplicity, because it can be similar in hardware to a prior art word processor or the like and can be operated by a procedure attainable with a usual software technique. The character output unit 70 may comprise a usual block or CRT display.

Figure 2:
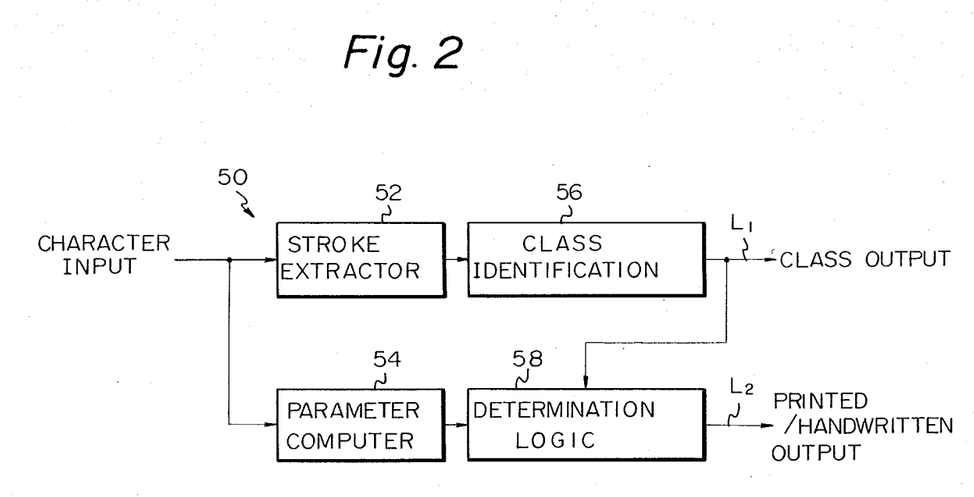
FIG. 2 is a block diagram showing an example of an evaluation unit installed in the apparatus of FIG. 1 for discriminating printed and handwritten characters from each other.

Referring to FIG. 2, an example of the evaluation unit 50 is shown. A character picked up by the character extraction unit 40 is fed to a stroke extraction circuit 52 and a parameter computing circuit 54. The stroke extraction circuit 52 is adaped to extract strokes which constitute each input character and determines the number of the strokes. Various methods have heretofore been presented for the extraction of strokes. One method includes the steps of thinning an input character, detecting end points and intersecting points of the character, and extracting as strokes the lines between intersecting points, between intersecting points and end points and between end points. The number of extracted strokes is coupled from the stroke extraction circuit 52 to a class identification circuit 56. Based on the number of strokes, the class identification circuit 56 determines the kind of the character, which will hereafter be assumed to be a kana or a kanji for illustrative purpose. In detail, the class identification circuit 56 compares the input stroke number n with a threshold $l_0$ and determines the character as a kanji if $n \geq l_0$ or a kana if $n < l_0$. The result of identification is fed through a signal line $L_1$ to the character processing unit 60 as well as to a determination logic circuit which determines whether the character has been printed or handwritten.

The parameter computing circuit 54 computes for each input character the parameters which reflect the difference between printed characters and handwritten characters. Various parameters are available such as those concerned with general shapes of characters and arrangements of picture elements within respective characters. The parameter computing circuit 54 in this embodiment is supposed to compute for each character the dimensional ratio $P_1$ of a rectangle engaging with the contour of the character, a bend picture element ratio $P_4$ which is a parameter related with the arrangement of border picture elements, and straight picture element ratio $P_5$, as will be defined below.

Figure 4:
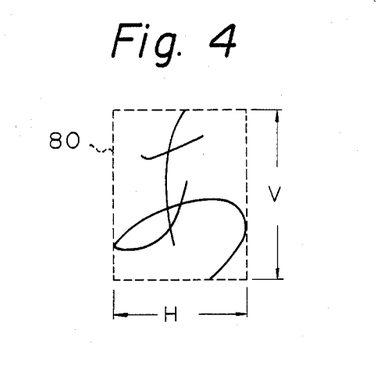
FIGS. 4–6 are diagrams for explaining three different kinds of parameters applicable for the discrimination of printed handwritten characters.
Figures 5A, 5B:
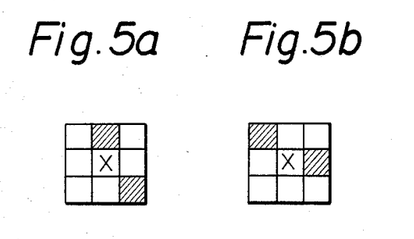
Figure 5C:
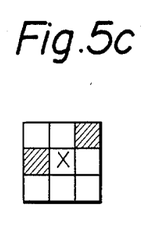
Figure 5D:
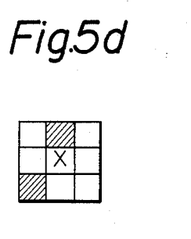
Figures 5E, 5F:
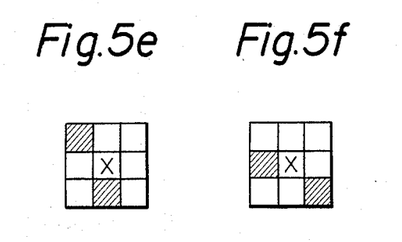
Figure 5G:
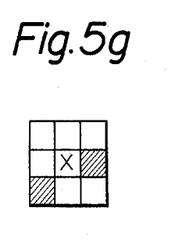
Figure 5H:
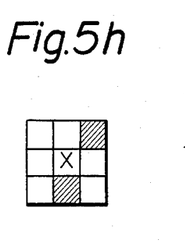

Dimensional Ratio $P_1$: This is the ratio of a vertical dimension to a horizontal dimension of a rectangle which engages with the contour of a character. That is, as shown in FIG. 4, it is the ratio V/H of a rectangle 80 which engages with the contour of a kana, where V is the vertical dimension and H the horizontal dimension.

Figure 6:
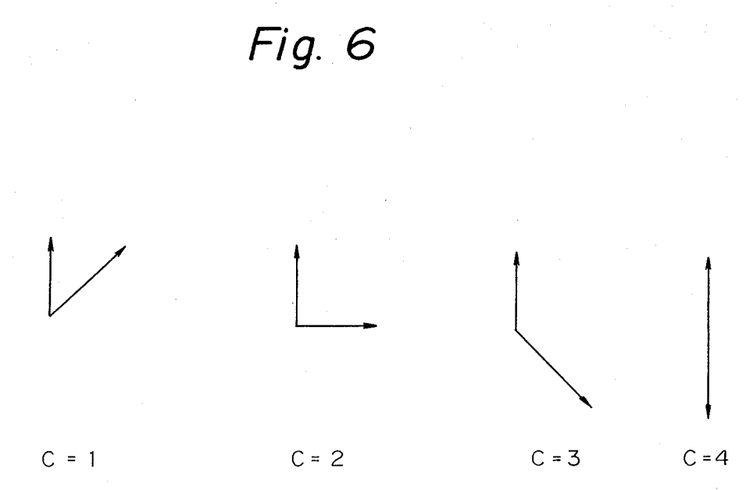

Bend Picture Element Ratio $P_4$: $3 \times 3$ picture elements adjacent to a border picture element X in question are observed. The specific picture element X is determined as a bend picture element when it is neighbored by the others in the position shown in FIG. 5a or in any one of the positions shown in FIGS. 5b–5h, which are provided by rotating the position of FIG. 5a by each 45°. In FIGS. 5a–5h, hatched picture elements are the border picture elements while blank picture elements are the non-border picture elements (including white picture elements). The "border picture elements" should be understood to indicate, of the black picture elements which constitute a character, those black picture elements neighbored by white picture elements from above or below or from the right or the left. Thus, the bend picture element ratio is the ratio of bend picture elements to the total picture elements of a character. Stated another way, defining the curvatures C of the local bends of border picture elements as shown in FIG. 6, the index showing a ratio of the border picture elements with C=3 is the bend picture element ratio.

Straight Picture Element Ratio $P_5$: Border picture elements arranged in the pattern with C=4 (FIG. 6) are the straight picture elements. The ratio of straight picture elements to the total border picture elements of a character is the straight picture element ratio. Eight C=4 patterns exist in total which are provided by rotating the pattern of FIG. 6 by each 45°.

Figure 7:
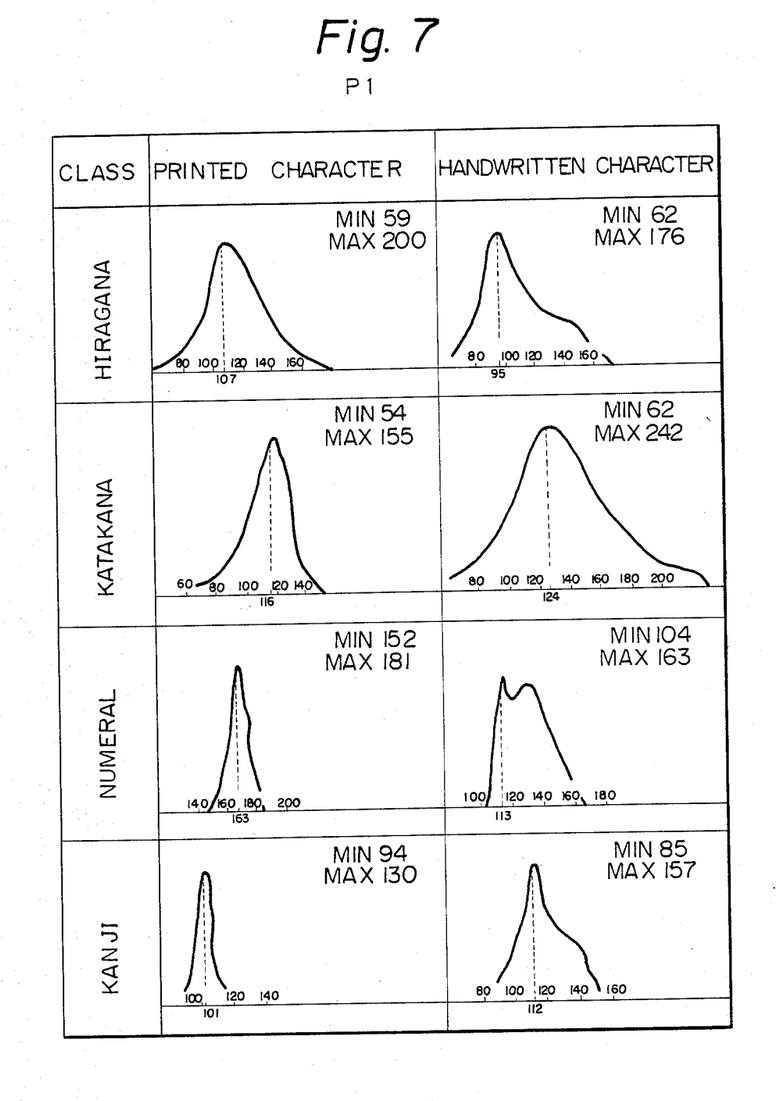
FIGS. 7–9 are plots indicating distributions of the respective parameters for different kinds of characters determined with respect to printed and handwritten characters.
Figure 8:
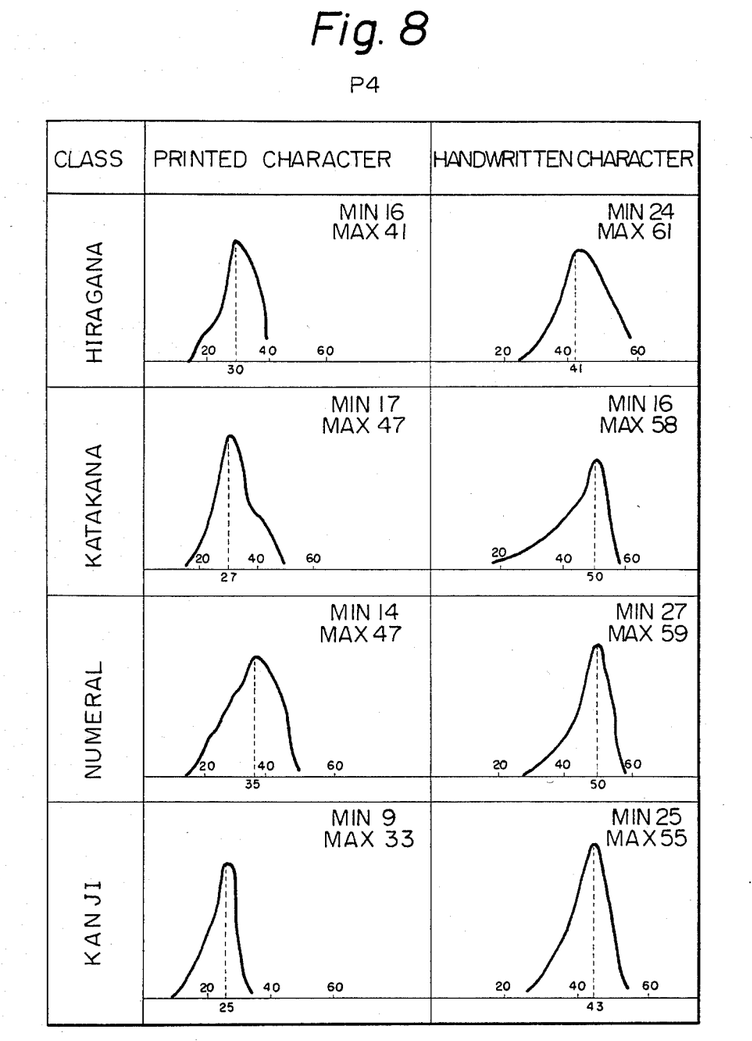
Figure 9:
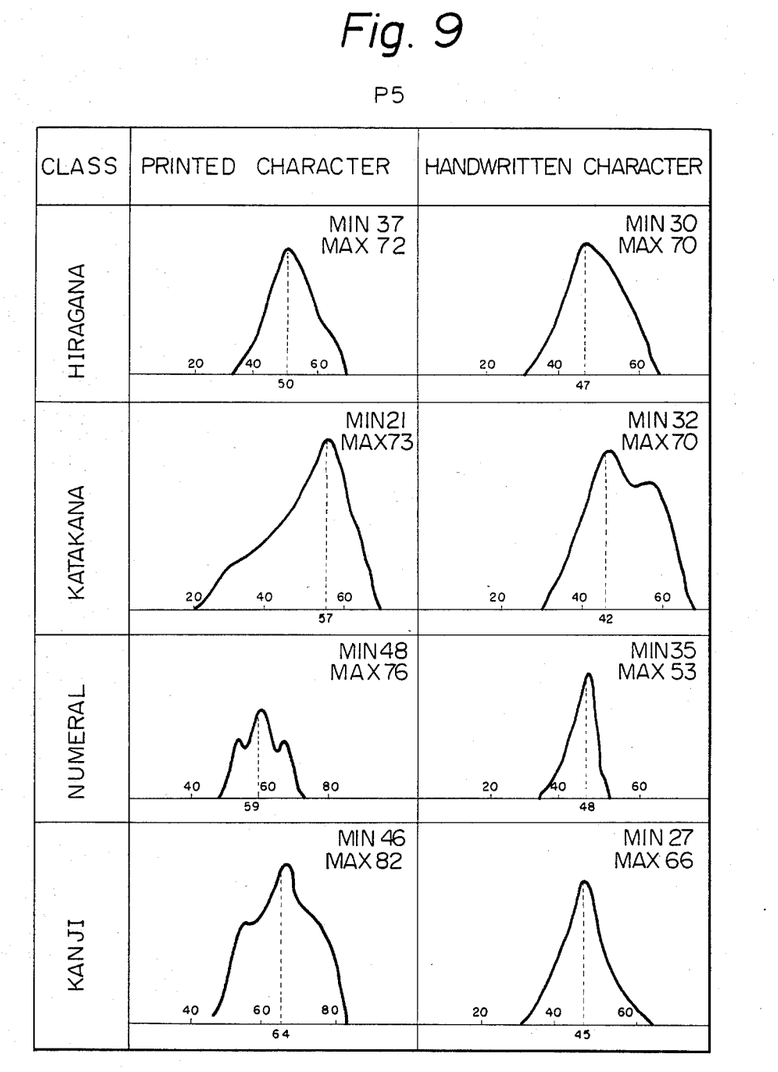

Actual distributions of parameters $P_1$, $P_4$ and $P_5$ for various classes or characters were measured as indicated in FIGS. 7, 8 and 9 respectively with respect to printed characters and handwritten characters. In FIGS. 7–9, the abscissas indicate the parameters 100 times as large as actual ones, and the ordinates indicate the frequencies of appearance of the respective parameters.

Referring again to FIG. 2, the logic circuit 58 performs the following procedure for identifying printed characters or handwritten characters and supplies the character processing unit 60 with the result through a signal line $L_2$.

A character determined as a kana by the class identification circuit 56 has its bend picture element ratio $P_4$ (100 times), which has been provided by the parameter computing circuit 54, compared with a threshold $l_1$. If $P_4 (100 \text{ times}) \geq l_1$, the character is discriminated to be handwritten (kana). If otherwise, the character is discriminated to be printed (kana). This is the end of the identification for said character.

On the other hand, a character determined as a kanji by the class identifying circuit 56 has its bend picture element ratio $P_4$ (100 times) compared with a threshold $l_2$. If $P_4 (100 \text{ times}) \geq l_2$, the character is discriminated to be handwritten (kanji) and the identification is terminated. If otherwise, the dimensional ratio $P_1$ (100 times) is compared with thresholds $l_3$ and $l_4$. If $P_1 (100 \text{ times}) \leq l_3$ or $P_1 (100 \text{ times}) \geq l_4$, it is determined to be handwritten (kanji) and the identification is terminated. If neither one of the above conditions holds, the straight picture element ratio $P_5$ (100 times) is compared with a threshold $l_5$. If $P_5 (100 \text{ times}) \leq l_5$, the character is determined to be handwritten (kanji) but, if not, then printed (kanji) and the identification is terminated.

The threshold $l_0$ may be selected to be "14", the the threshold $l_1$ "45", the threshold $l_2$ "35", the threshold $l_3$ "90", the threshold $l_4$ "120" and the threshold $l_5$ "45".

Figure 3:
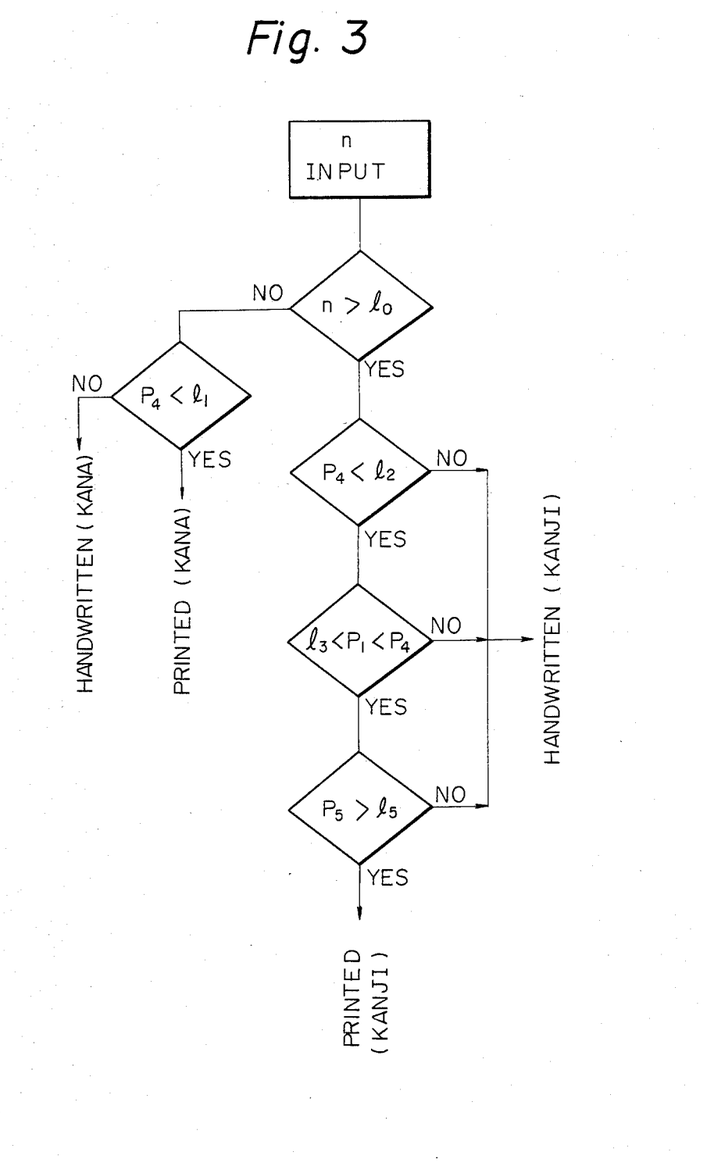
FIG. 3 is a flowchart demonstrating the operation of the evaluation unit.

The sequential steps of operation of the evaluation unit 50 discussed hereinabove are shown in flowchart in FIG. 3.

It should be noted that the construction of the evaluation unit 50 described with reference to FIG. 2 is only illustrative. The unit 50 may be constructed to identify three or more different kinds of characters, instead of two (kana and kanji) in the embodiment shown and described. Also, the procedure for the discrimination of the machine- and hand-printed characters is not limited to the above-mentioned. Parameters for the discrimination other than those mentioned may be employed, if desired.

The character data processing apparatus of the present invention is capable of processing various documents as will be described with reference to FIGS. 10–12.

Figure 10:
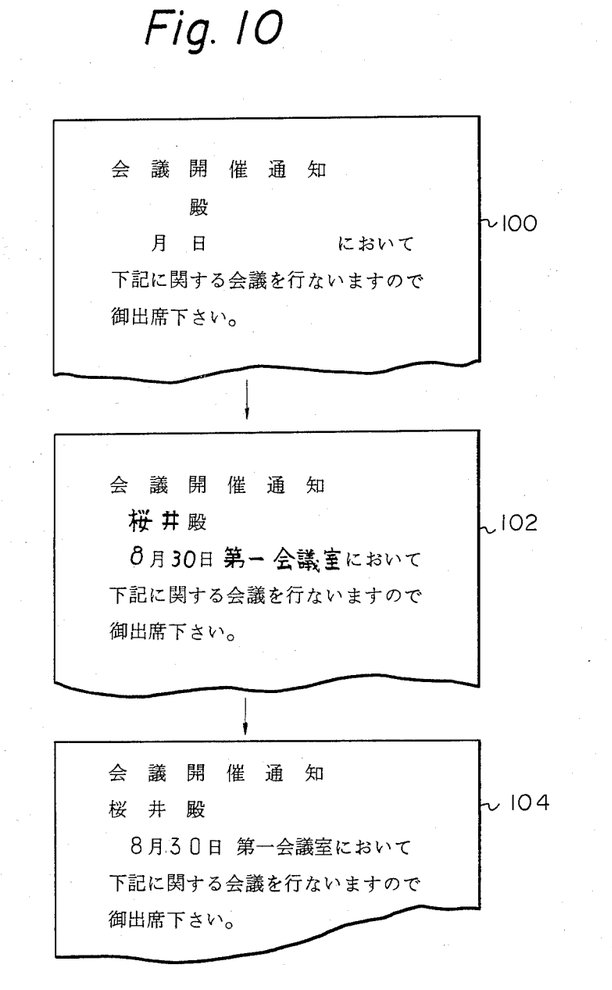
FIGS. 10–12 are diagrams demonstrating some examples of document processings which the character data processing apparatus of the invention can perform.

FIG. 10 illustrates a function for processing data on a fixed form which was partly filled by hand and preparing a printed document. First, necessary items are written by hand in specific portions on a document 100 the rest of which was filled with printed data. The resulting document is designated by the reference numeral 102 in which handwritten characters are shown thicker than the others. When the document 102 is inputted in the apparatus of the present invention, the handwritten characters will have been transformed into printed characters on an output document 104. The transformation from the handwritten characters to the printed characters is carried out by the character processing unit 60 (FIG. 2).

Figure 11:
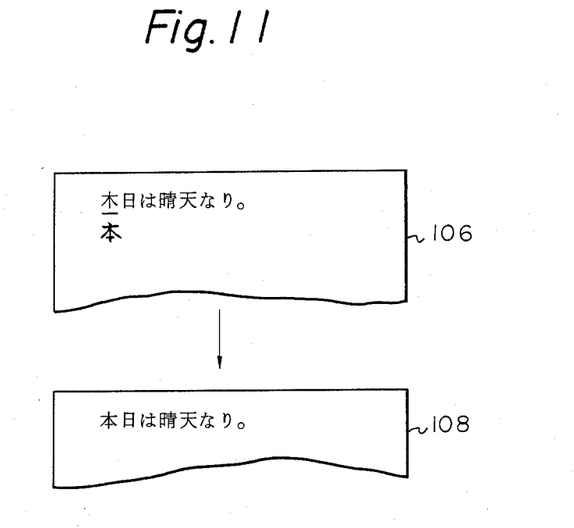

FIG. 11 shows an example of correction of data. A character to be corrected on a galley proof is underlined and a correct character is written by hand below the character to be corrected. When such a galley proof is introduced into the apparatus of the present invention, a document 108 will be produced on which the character above the underline is replaced by a printed version of the handwritten correct character.

Figure 12:
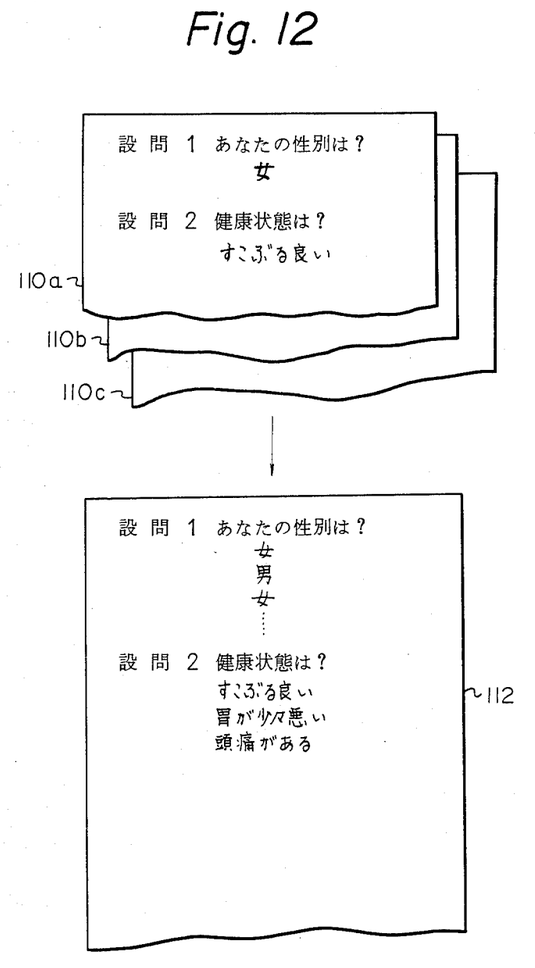

FIG. 12 indicates a function of totalizing the replies to a questionnaire which were written by hand and submitted in a free form. Questionnaires 110a–110n are sequentially put into the apparatus of the present invention so that the handwritten replies for each question are gathered to prepare a reply list 112.

In summary, it will be seen that the present invention provides a characters data processing apparatus which is capable of discriminating printed characters and handwritten characters on a document and processing them independently of each other. The apparatus thus promotes easy and efficient processings such as preparation of fixed forms, correction, editing and totalization replies to a questionnaire.

Various modifications will become possible for those skilled in the art after receiving the teachings of the present disclosure without departing from the scope thereof. For example, the apparatus of the present invention is similarly applicable for the discrimination of capital and small alphabets.

What is claimed is:

1. A character data processing apparatus comprising:
   a scanning means for scanning an original document carrying handwritten character data to produce electric image data;
   character extraction means for extracting each character from the image data;
   character identification means for identifying the characteristics of the extracted character; and
   character processing means for processing the identified character into printed character data;
   the character identification means comprising a character shape detector for detecting the shape of the extracted character which is one of a plurality of shapes;
   the character shape detector comprising a character stroke extractor for extracting the number of strokes of the extracted character, and a character shape estimater for estimating the shape of the extracted character depending on the extracted number of strokes.

2. A character data processing apparatus as claimed in claim 1, in which the scanning means comprises an analog-to-digital converter for converting analog image data into binary image data.

3. A character data processing apparatus as claimed in claim 2, in which the scanning means further comprises an input buffer for sequentially storing the binary image data.

4. A character data processing apparatus as claimed in claim 1, in which the plurality of character shapes are capital and small alphabets.

5. A character data processing apparatus comprising:
   a scanning means for scanning an original document carrying handwritten character data to produce electric image data;
   character extraction means for extracting each character from the image data;
   character identification means for identifying the characteristics of the extracted character; and
   character processing means for processing the identified character into printed character data;
   the character identification means comprising a character shape detector for detecting the shape of the extracted character which is one of a plurality of shapes;
   the plurality of character shapes being kanas (Japanese syllabary) and kanjis (Chinese characters used in Japan).

6. A character data processing apparatus comprising:
   a scanning means for scanning an original document carrying handwritten character data to produce electric image data;
   character extraction means for extracting each character from the image data;
   character identification means for identifying the characteristics of the extracted character; and
   character processing means for processing the identified character into printed character data;
   the character identification means comprising a character shape detector for detecting the shape of the extracted character which is one of a plurality of shapes;
   the character identification means further comprising a printed/handwritten character discriminator for discriminating printed characters and handwritten characters from each other.

7. A character data processing apparatus as claimed in claim 6, in which the printed/handwritten character discriminator comprises a calculator for calculating parameters which reflect a difference between printed characters and handwritten characters.

8. A character data processing apparatus as claimed in claim 7, in which the printed/handwritten character discriminator further comprises a printed/handwritten character determiner for determining whether or not the extracted character is a handwritten character.

* * * * *